United States Patent
Murakami et al.

[11] Patent Number: 5,353,278
[45] Date of Patent: Oct. 4, 1994

[54] MAGNETO-OPTICAL DISK AND METHOD OF MANUFACTURING THE SAME

[75] Inventors: Yoshiteru Murakami, Nishinomiya; Junichiro Nakayama, Shiki; Hiroyuki Katayama; Akira Takahashi, both of Nara; Kenji Ohta, Kitakatsuragi; Hirotaka Toki, Kashihara, all of Japan

[73] Assignee: Sharp Kabushiki Kaisha, Osaka, Japan

[21] Appl. No.: 694,990

[22] Filed: May 2, 1991

[30] Foreign Application Priority Data

May 8, 1990 [JP] Japan ................ 2-119451
May 10, 1990 [JP] Japan ................ 2-121472

[51] Int. Cl.$^5$ ............................... G11B 5/54
[52] U.S. Cl. ......................... 369/290; 360/105
[58] Field of Search ............... 369/275.2, 275.3, 290, 369/13, 257; 360/114, 105

[56] References Cited

U.S. PATENT DOCUMENTS 5,057,960 10/1991 Shiba et al. .................... 369/290
5,072,438 12/1991 Suzuki et al. ................... 369/290

FOREIGN PATENT DOCUMENTS 0263512 4/1988 European Pat. Off. .
60-256931 12/1985 Japan .
1098118 4/1989 Japan .
2015441 1/1990 Japan .

OTHER PUBLICATIONS

Ira A. Gerson and Mark A. Jasuik, "Vector Sum Excited Linear Prediction (VSELP) Speech Coding at 8 KBPS", Proc. IEEE Int. Conf. ASSP, pp. 461–464 Apr. 1990.

High Speed Overwritable Magneto-Optic Recording, Proc. Int. Symp. on Optical Memory, 1987, Japanese Journal of Applied Physics, vol. 26 (1987) Supplement 26-4.

Primary Examiner—Paul M. Dzierzynski
Assistant Examiner—Kiet T. Nguyen
Attorney, Agent, or Firm—David G. Conlin; Donald Brown

[57] ABSTRACT

A magneto-optical disk comprising a substrate whereon a recording medium is formed, and a depression is formed on the substrate on the inside of the recording medium of the substrate. A center hub is installed on the depression such that the center hub is substantially level with a protective resin layer covering the recording medium. On the center hub, a flying head performs CSS (Contact Start and Stop). This configuration of the disk eliminates the occurrence of dust due to the abrasion and head crash, and achieves stable CSS. A method of manufacturing the magneto-optical disk, wherein the protective resin layer is formed after installing the center hub on the depression. In this method, since a space is not produced between the center hub and the protective resin layer, the stable flying characteristics is obtained. And a magneto-optical disk whereon small physical bumps and pits are formed on the substrate on the inside of the recording medium, which prevents the flying head from sticking to the disk. A method of manufacturing the magneto-optical disk by using a stamper, which permits the disk to be mass produced.

8 Claims, 9 Drawing Sheets

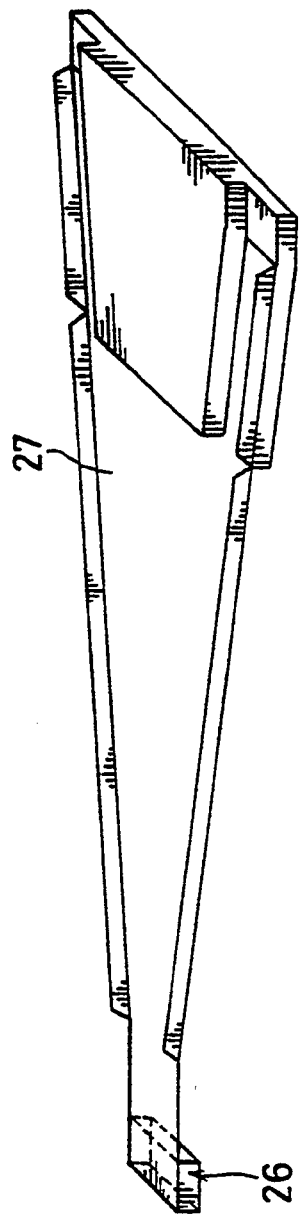
FIG. 7 (a) PRIOR ART
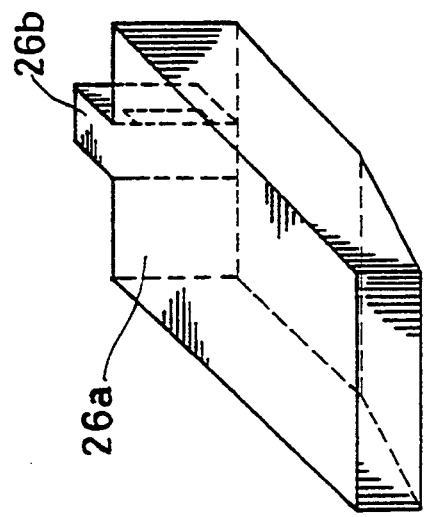
FIG. 7 (b) PRIOR ART

MAGNETO-OPTICAL DISK AND METHOD OF MANUFACTURING THE SAME

FIELD OF THE INVENTION

The present invention relates to a magneto-optical disk to be used with a magneto-optical recording and reproducing device having a flying head, and to the method of manufacturing the magneto-optical disk.

BACKGROUND OF THE INVENTION

In recent years, research and development into a magneto-optical memory element has been much more carried out than research and development into a read only optical memory element, such as a so-called compact disk, and the magneto-optical memory element now comes into practice. The magneto-optical memory element has a high capacity and whereon information can be recorded, reproduced and erased. Lately, a study of the recording system has been made to realize higher speed and higher density recording, and especially a recording method called overwriting has been focused. In the overwriting, recorded information can be rewritten directly without erasing, thereby permitting time required for recording to be shortened.

The following will explain the overwriting together with a conventional recording system.

In recording, first a perpendicular magnetized film that is a recording medium is initialized by applying a strong external magnetic field or the like so as to produce a uniform magnetization direction. To make the explanation easy, it is assumed in this example that the direction of magnetization is set in a predetermined direction, e.g. upwards in a direction crossing the film surface at a right angle. Next, a laser beam having a high output level is irradiated on a portion wherein information to be recorded so as to raise the temperature thereon to or exceed the Curie temperature or the vicinity of the magnetic compensation temperature of the recording medium. This method allows the coercive force on the recording portion to be substantially zero, so that the magnetization direction of the recording portion can be switched downwards by applying a magnetic field whose direction is downwards in a direction crossing the film surface at a right angle. When the irradiation of the laser beam is stopped, the temperature of the recording portion return to room temperature, which permits the switched magnetization direction to be fixed and information to be recorded thermomagnetically.

In reproduction, a laser beam having such a low level of output that it does not switch the magnetization direction due to the temperature rise is irradiated on the recording medium, and information is detected optically by the use of an effect that the direction of rotation of a polarization plane varies according to the magnetization direction.

There are two information rewriting systems for writing new information in portions storing other information. (1) A system in which a recording medium is initialized through erasing operation so that a uniform magnetization direction of the recording medium is produced again, and new information is then recorded thereon. (2) The overwriting system in which information is directly rewritten without erasing by improving a recording medium or an external magnetic field generating device.

In the system of (1), an erase head needs to be provided separately, or recording can be performed only after erasing if only one magnetic head is used. However, providing the erase head causes a manufacturing cost rise and the device to be larger in size. In the mean time, if a single magnetic head is employed like many conventional devices, the same time taken for recording is required for erasing, so a long time is needed for rewriting.

If improving the external magnetic field generating device relating to the ore writing system of (2) is adopted, i.e. the direction of an external magnetic field is switched from downwards to upwards or vice versa according to information to be recorded while keeping the laser beam to have a high output level, the recording medium does not need to be changed much from the conventional one, and therefore it seems to be the most effective way.

To achieve a high-density recording, if the direction of an external magnetization is switched at a very high frequency rate, for example about 10 MHz, a coil and a coil core of the external magnetic field generating device need to be miniaturized to a sufficient level. This causes the intensity of the generated magnetic field to be lowered and the magnetic field generating area to be smaller. Therefore, the magnetic head and the recording medium need to get closer each other sufficiently, i.e. specifically the head-to-medium separation ranges from several micrometers to some tens of micrometers. If a stationary type magnetic head is employed, it is difficult to achieve the above-mentioned small clearance between the magnetic head and the recording medium as the surface of the recording medium is vibrated, i.e. bumps and pits exist in a circumferential direction.

To counteract this, as shown in FIGS. 7(a)(b), a flying head 26 of a slider type which is capable of sliding over a magneto-optical disk may be used as an external magnetic field generating device. In order to make the flying head 26 fly above the magneto-optical disk surface, the flying head 26 comprises a slider section 26a provided with a magnetic field generating member 26b and is pressed towards the magneto-optical disk surface while being supported by a suspension 27. The magnetic field generating member 26b is composed of a coil and a coil core (not shown specifically), and the suspension 27 is made, for example, of a plate spring. The flying head 26 maintains a constant flying height by making a flying force exerted upwards due to the air flow between the slider section 26a and the magneto-optical disk caused by the spinning disk balance a depressing force exerted downwards by the suspension 27. The flying type magnetic head thus described is adopted in conventional hard disk system, and the flying height in the system is generally submicron order. In the mean time, in case the recording medium is a magneto-optical disk, dust tends to stick on the disk surface more frequently as the magneto-optical disk is transportable, and troubles such as a crash may occur when the head gets close to the disk excessively. Therefore, a flying height of 5 $\mu$m to 15 $\mu$m which is higher than a flying height in the hard disk system is needed for the magneto-optical disks.

In magneto-optical recording using the flying head 26, the flying head 26 maintains a constant flying height while a magneto-optical disk rotates at a constant speed, however it needs to be supported by some means when the disk starts/stops rotating and is in a static state. For supporting the disk, two methods are listed. (I) Improving the supporting mechanism of the flying head 26 so as to prevent the head from making contact with the magneto-optical disk when the disk is in a static state. (II) Making the flying head 26 slide over or come into contact with the magneto-optical disk when the disk starts/stops rotating and is in a static state.

There is a problem in method (I) that the supporting mechanism becomes extremely complicated. Method (II) called CSS (Contact Start and Stop) method is a common use method in the field of hard disk. In the CSS method, the ability of a magneto-optical disk surface to endure slides is a very important factor. In a conventional hard disk system, a lubricating layer having the excellent ability to endure slides is formed on a recording medium. The lubricating layer is formed by applying, for example fluorocarbon lubricating oil which is a liquid lubricant (usually perfluoropolyether) or PTFE (polytetrafluoroethylene) which is a solid lubricant onto the recording medium.

Additionally, in the CSS method, it is necessary to prevent data from being lost by head crash when the recording medium starts or stops spinning, i.e. when the flying head slides over the recording medium. In the hard disk system, therefore, a flying head is generally allowed to perform contacting and sliding action in an area for CSS which is located inside of the recording area of the disk. With a recording and reproducing device using a magneto-optical disk, it may also be preferable to allow a flying head to perform a sliding action in an area other than the recording area of the disk.

As shown in FIGS. 10(a)(b), a conventionally suggested magneto-optical disk comprises a transparent substrate 21, a recording medium layer 22, a protective resin layer 23, and a center hub 24.

Polycarbonate which can be mass-produced by the injection molding is widely used as the transparent substrate 21. The transparent substrate 21 is provided with guide tracks and guide address grooves 21a whereon track and address information is recorded so as to guide an optical beam used for recording and reproducing information to a given position. In the injection molding, the guide tracks and the guide address grooves 21a are formed by the use of a stamper installed in a metallic mold (not shown) when the transparent substrate 21 is formed. At this time, a stamper presser groove 21b is secondarily formed by a member for fixing the stamper in the metallic mold, so called a stamper presser.

The recording medium layer 22 is formed such that it covers the guide tracks and the guide address grooves 21a, and has multilayer structure (however, shown as a single layer in the figure), for example, a first transparent dielectric film, a thin film made of an alloy of rare earth elements and transition metals that is a magneto-optical recording medium, a second transparent dielectric film, a reflecting film are laminated in that order onto the transparent substrate 21.

The protective resin layer 23 protects the recording medium layer 22 from scratches, dust and oxidization. For materials as the protective resin layer 23, an ultraviolet hardening resin is widely used. The ultraviolet hardening resin has excellent waterproof properties and environment resistance, and the advantages of handling and processing time. The protective resin layer 23 is usually formed by the spin coating method. For example, first the ultraviolet hardening resin is applied to the recording medium layer 22 by spin coating, wherein the resin is dropped onto the outer edge of the stamper presser groove 21b so as to cover the recording medium layer 22. Next, ultraviolet light is irradiated on the resin to harden it.

The center hub 24 is a means for loading a magneto-optical disk into a rotating spindle of a recording and reproducing device. Since the guide tracks/guide address grooves are not coaxial with a center hole 21c of the transparent substrate 21 generally, the center hub 24 absorbs this during the loading. The center hub 24 has a guide hole 24a which is used for loading the disk into the rotating spindle 25 (see FIG. 11(b)) of the recording and reproducing device. Regarding the material for the center hub 24, stainless steel, for example, SUS430 is used because the center hub 24 is often installed into the rotating spindle 25 magnetically.

For the shape of the center hub 24, the one with an outward flange 24b formed on the upper edge thereof shown in FIG. 10(b) is widely used. The outward flange 24b is mounted on one side of the transparent substrate 21, i.e. on the side whereon the recording medium layer 22 is formed, by an adhesive agent, such as epoxy adhesive agent, silicone adhesive agent, ultraviolet hardening resin and double-sided adhesive tape.

FIGS. 11(a)(b) shows the recording and reproducing device for recording and reproducing information on the magneto-optical disk using the CSS method.

The magneto-optical disk of FIGS. 10(a)(b) is magnetically secured to the rotating spindle 25, and a flying head 26 is disposed above the magneto-optical disk.

In the mean time, an optical head 29 having an optical system unit is disposed below the magneto-optical disk. Since the optical head 29 needs to move with the flying head 26 in a radial direction of the magneto-optical disk, a supporting base 28 is connected to the optical head 29. An objective lens 29a of the optical head 29 is located opposite the undersurface of a magnetic field generating member 26b of the flying head 26.

Based on the above arrangement, the following provisionally deduces a range where the flying head 26 is allowed to perform sliding action in the CSS method.

If a 3.5-in. (86-mm) diameter substrate which is most demanded as a consumer product is employed as the transparent substrate 21, the recording area where the guide tracks and the guide address grooves 21a are formed occupies the area between the radii of about 22 mm and 40 mm of the substrate. In order to ensure the magneto-optical recording characteristics in this recording area, it is preferable to for the recording medium layer 22 in the range of radius $r_1'$ (FIG. 10(a))=20.5 mm to radius $r_2'=41.5$ mm.

The size of a slider 26a of the flying head 26 is determined according to the flying characteristics and the like, and a sliding surface of the slider 26a with respect to the magneto-optical disk needs to be ensured to be about 4 mm in a radial direction and about 5 mm in a circumferential direction of the magneto-optical disk.

If the above sizes are taken into consideration, it is difficult to allow the flying head 26 to slide outside of the recording area of the magneto-optical disk, and therefore the sliding area (CSS area) needs to be located on the inside of the recording area. In order to prevent losing data in the recording medium, it is preferable not to provide the CSS area outside of a radius of 20 mm if the recording area is not formed inside of radius $r_1'$, i.e. a radius of 20.5 mm.

Next, disallowing for the outer side face of the rotating spindle 25 making contact with the inner edge of the optical head 29, the innermost permissible CSS area is determined.

The outer diameter of the rotating spindle 25 is determined according to a motor torque and the area of a cramping zone, and it is about 21 mm (10.5 mm in radius) here. In the mean time, the optical head 29 is provided with an actuator (not shown) for actuating an objective lens 29a to execute stable servo of a light beam, and is covered with a housing for protecting optical parts from dust or the like. Therefore, the distance between the center of the beam and the inner edge of the optical head 29 is about 8.5 mm at least. According to the above-mentioned dimensions, to prevent the rotating spindle 25 from making contact with the optical head 29, the central point of the optical beam (i.e. the position of the magnetic field generating means 26b) should not be inside of a 19-mm radius of the substrate.

Therefore, the magnetic field generating member 26b is positioned in the range of a 19 mm radius to a 20 mm radius of the substrate, and thus the area where the flying head 26 executes CSS is restricted to a very limited range.

Further, as aforesaid, the stamper presser groove 21b on the transparent substrate 21 is just secondarily formed by transferring the stamper presser member for securing the stamper to the metallic mold onto the transparent substrate 21. Therefore, the stamper presser groove 21b can not be formed much inside. If the stamper presser groove 21b is formed innermost permissible position, its outer edge is located about 15 mm radius position of the substrate (the width of the stamper presser groove 21b is about 1 mm).

If the adhesive strength and the flatness of the center hub 24 to the transparent substrate 21 are taken into account, the center hub 24 needs a certain area for adhesion, and therefore the hub 24 needs to have, for example, a diameter of about 28 mm. As described above, the CSS area is also restricted by the position of the stamper presser groove 21b and the adhesive area of the center hub 24.

Therefore, the area where CSS action can be executed is only a small range of 15 mm to 20 mm in radius. As a result, the shape of the flying head 26 including the magnetic field generating men, her 26b is restricted, and the degree of freedom of the flying characteristics decreases.

The protective resin layer 23 for protecting the recording medium layer 22 is formed in the shape of a concentric circle from the outer edge of the stamper presser groove 21b. Since the flying head has a flying force due to the air flow between the flying head 26 and the surface of the protective resin layer 23, it is necessary to have the protective resin layer 23 on the portions of the recording medium layer 22, which faces the surface of the slider 26a of the flying head 26 during CSS action. In this case, if the slider 26a deviates from its regular position and a part of the slider 26a enters an inner portion of the substrate which is not covered with the protective resin layer 23, a turbulent air flow is caused, and thereby the flying characteristics are adversely affected.

Even if the slider 26a does not enter the inner portion, turbulence from the air flow may happen as the edge of the slider 26a is very close to the edge of the protective resin layer 23 as shown in FIGS. 11(a)(b), and therefore this is not an ideal state.

The protective resin layer 23 is developed to obtain environmental resistance such as waterproof properties and moisture resistance as its duty is protecting a thin film made of an alloy of rare earth elements and transition metals which is a very easily oxidizable film. However, it fails to obtain the ability to sufficiently endure slides and wear resistance against CSS action, so some problems may arise, i.e. the slider 26a sticks to the protective resin layer 23 and dust is raised due to the abrasion. A protective resin having the ability to endure slides, wear resistance and environmental resistance has being developed. In the mean time, it is confirmed that fluorine contained polymers having the excellent ability to endure slides and wear resistance can not obtain sufficient environmental resistance.

There is an idea of forming a fluorine contained polymer resin onto the protective resin layer 23, however this causes increases in the number of parts and in cost. Additionally, the affinity between two kinds of resin is insufficient, so this is not an effective method.

Further, some magneto-optical disks which can be used with a flying head are manufactured with small physical bumps and pits (hereinafter referred to as texture) on a surface thereof facing the flying head 26 so as to prevent the disk surface from sticking to the surface of the flying head 26. As shown in FIGS. 8(a)(b), the texture is given by pressing a texture tape 31 having small bumps and pits on its surface onto a magneto-optical disk 30 by the use of a tape presser roller 32 while feeding the tape 31 in the direction of arrow C and rotating the disk 30. In this case, the direction of rotation of the disk 30 is substantially parallel with the feeding direction of the tape 31, and therefore the texture is uniformly given to the surface of the disk 30 facing the flying head 26 in the direction shown by the alternate long and two short dashes line of FIG. 9.

However, in order to manufacture the magneto-optical disk 30 with the texture, the tape 31 needs to be pressed onto the disk 30 one by one, causing an increase in cost. Thus, this is not suitable for mass manufacturing. In manufacturing, unnecessary stress may be given onto the disk 30 and dust may stick on the surface, and therefore the quality of the disk 30 may be lowered.

SUMMARY OF THE INVENTION

An object of the present invention is to provide a magneto-optical disk which allows dust due to abrasion and damages such as scratches to be decreased and a stable CSS (Contact Start and Stop) action to be achieved.

Another object of the present invention is to provide a magneto-optical disk which allows the degree of freedom, of the shape of a flying type magnetic head and of setting the flying characteristics to be increased, and the flying characteristics to be stabilized.

A further object of the present invention is to provide a method of manufacturing a magneto-optical disk with a protective resin layer that leads to high reproducibility, wherein the protective resin layer specifically joins to the outer edge of a center hub.

Yet another object of the present invention is to provide a magneto-optical disk which prevents a flying head from sticking to the disk when the head comes into contact with and slides over the disk during start and end of recording/erasing.

A still further object of the present invention is to provide a method of manufacturing a magneto-optical disk which permits physical bumps and pits to be formed on a substrate at the same time as the substrate is produced.

In order to achieve the above objects, a magneto-optical disk of the present invention whereon information is recorded by the use of a flying head, comprises a substrate, a magneto-optical recording medium formed on the substrate, a protective resin layer for covering the magneto-optical recording medium, and a center hub installed on the substrate on the inside of the magneto-optical recording medium, the disk is characterized in that a depression formed on the inside of the substrate recording medium, the center hub mounted on the depression so that the center hub is substantially level with the protective resin layer, and a sliding and contacting area where the flying type magnetic head performs sliding and contacting action provided on the center hub.

With the above arrangement, since the flying head slides over and comes into contact with the center hub made of stainless steel or the like, dust due to abrasion and damages such as scratches are caused less in comparison to the case where the flying head slides over and comes into contact with the protective resin layer, thereby achieving a stable CSS action. In addition, the structure of the present invention can be achieved simply by slightly increasing the outer circumference of a conventional center hub accordingly. Therefore, there is no drawback in cost and the number of manufacturing steps.

As there is a sufficiently large space above the center hub, the degree of freedom of the shape of the flying head increases and that of setting the flying characteristics also increases proportionally. Moreover, there is no possibility of the flying head moving outside of the center hub during sliding, thereby permitting the flying characteristics to be stabilized.

A method of manufacturing a magneto-optical disk of the present invention is characterized in that after mounting the center hub on a depression of the substrate, the protective resin layer is formed so that it precisely joins to the outside edge of the center hub to allow the protective resin layer to be substantially level with the center hub.

In the above method, as the depression is made on the substrate and the center hub is mounted thereon, the center hub can be substantially level with the protective resin layer. This arrangement reduces the possibility of head crash when a flying type magnetic head passes through the boundary section between the center hub and the protective resin layer.

Besides, since the protective resin layer is formed after mounting the center hub on the substrate, the magneto-optical disk whereon the protective resin layer specifically joining to the outside edge of the center hub is formed can be manufactured with an excellent reproducibility. On the magneto-optical disk, there is no gap between the center hub and the outer edge of the protective resin layer, so that flying characteristics do not vary even when the flying head passes through the boundary section between the center hub and the protective resin layer. As a result, the possibility of head crash can further be dropped.

In order to achieve the above objects, another magneto-optical disk of the present invention comprises: a substrate having a depression in its outer portion; a magneto-optical recording medium formed on the depression; a protective resin layer with which the magneto-optical recording layer is covered so that the surface of the outer portion of the substrate becomes uniform to the surface of the inner portion thereof; and an area in the inner portion where the flying head performs contacting and sliding action, wherein small physical bumps and pits are formed in the area of the substrate.

In the above arrangement, the magneto-optical disk can prevent the flying head from sticking to the disk as the small physical bumps and pits are formed on the substrate in the area located inside of the substrate recording layer, i.e. the area where the flying head performs contact start/stop (the magnetic head makes contact with the magneto-optical disk when the disk starts/stops rotating). It is also possible to manufacture a magneto-optical disk having a uniform thickness by making a portion of the substrate wherein the physical bumps and pits are formed thicker than a portion of the substrate wherein the recording layer is formed, i.e. by making a depression.

A method of manufacturing a magneto-optical disk relating to the present invention, is characterized in that the magneto-optical disk is manufactured by chemically etching a substrate having physical bumps and pits or by the use of a stamper whereon a desired structure is etched beforehand.

In this method, the physical bumps and pits are formed on the substrate by chemical etching or by the use of the stamper having a desired structure etched thereon in advance at the same time as the substrate is manufactured, which permits the steps in the manufacturing to be reduced. This also restrains dust from sticking onto the disk and preventing unnecessary stress from being applied to the disk. As a result, the magneto-optical disk can be mass produced without lowering the quality.

For a fuller understanding of the nature and advantages of the invention, reference should be made to the ensuing detailed description taken in conjunction with the accompanying drawings.

BRIEF DESCRIPTION OF THE DRAWINGS

FIG. 1 to FIG. 4 illustrate an embodiment of the present invention.

FIG. 5 is a vertical section illustrating the structure of a magneto-optical disk.

FIG. 6 is a vertical section illustrating the processes of manufacturing the magneto-optical disk.

FIG. 7(a) is a schematic perspective view illustrating a flying head and a suspension.

FIG. 7(b) is a perspective view illustrating the flying head.

FIG. 8 to FIG. 11 illustrate a conventional example.

FIG. 9 is an front elevation view illustrating the direction of the texture given to the magneto-optical disk.

DETAILED DESCRIPTION OF THE PREFERRED EMBODIMENTS

Referring to FIG. 1 to FIG. 4, the following will explain one embodiment of the present invention.

Figure 2A:
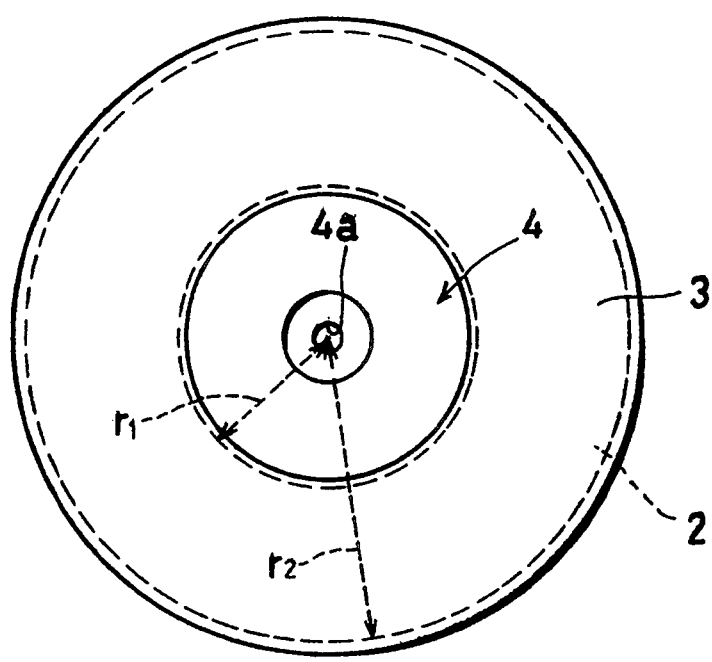
FIG. 2(a) is a schematic plan view illustrating the magneto-optical disk.
Figure 2B:
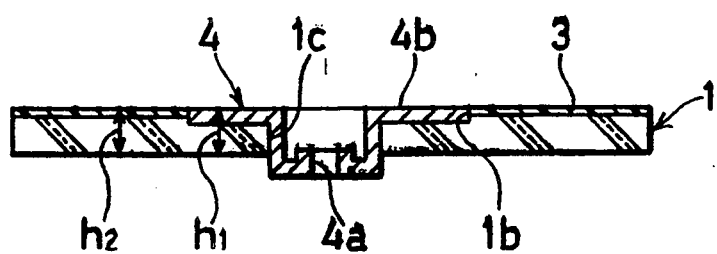
FIG. 2(b) is a schematic vertical section illustrating the magneto-optical disk.
Figure 3A:
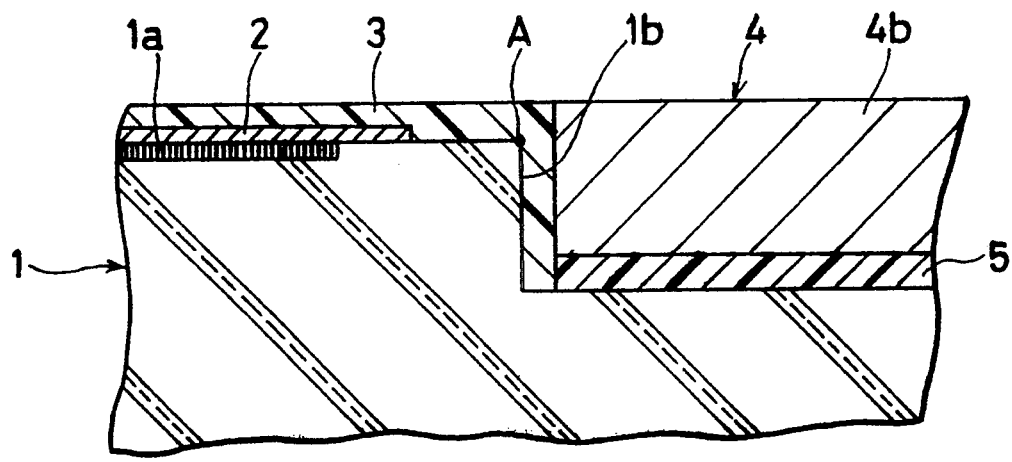
FIG. 3(a) is an enlarged partial sectional view of FIG. 2(a).

As shown in FIGS. 2(a)(b) and FIG. 3(a), a magneto-optical disk relating to this embodiment comprises a transparent substrate 1, a recording medium layer 2 (which is not shown in FIG. 2(b) to simplify the drawing) as a magneto-optical recording medium formed on the substrate 1, a protective resin layer 3 covering the substrate 1, and a center hub 4 mounted on the center of the substrate 1.

The transparent substrate 1 is made of a transparent resin, for example polycarbonate, by injection molding. Guide tracks and guide address grooves 1a (not shown in FIG. 2(b)), whereon tracks and address information for guiding a laser beam irradiated from an optical head 10 (see FIG. 1(b)) to a desired recording or reproduction portion are recorded, are also formed in the injection molding process.

Besides, a depression 1b is formed on the transparent substrate 1 on the inside of the recording layer 2 of the substrate 1 to install the center hub 4 therein. The inner diameter of the depression 1b is slightly larger than the outer diameter of a flange 4b of the hub 4. The depression 1b is formed by contriving the shapes of a stamper and a stamper presser member (not show) when manufacturing the substrate 1 by injection molding.

The formed recording medium layer 2 covers the guide tracks and the guide address grooves 1a on the transparent substrate 1. The recording medium layer 2 has multilayer structure, for example a first transparent dielectric film, a thin film made of an alloy of rare earth elements and transition metals as a magneto-optical recording medium, a second transparent dielectric film, and a metallic reflecting film are laminated in that order on the substrate 1 (to illustrate simply, it is shown as a single layer in FIG. 3(a)).

The formed protective resin layer 3 covers the recording medium layer 2 to protect it from oxidization and damage and is slightly larger than the recording medium layer 2 in a radial direction. As a material for the protective layer 3, for example a ultraviolet hardening resin is used.

Figure 1A:
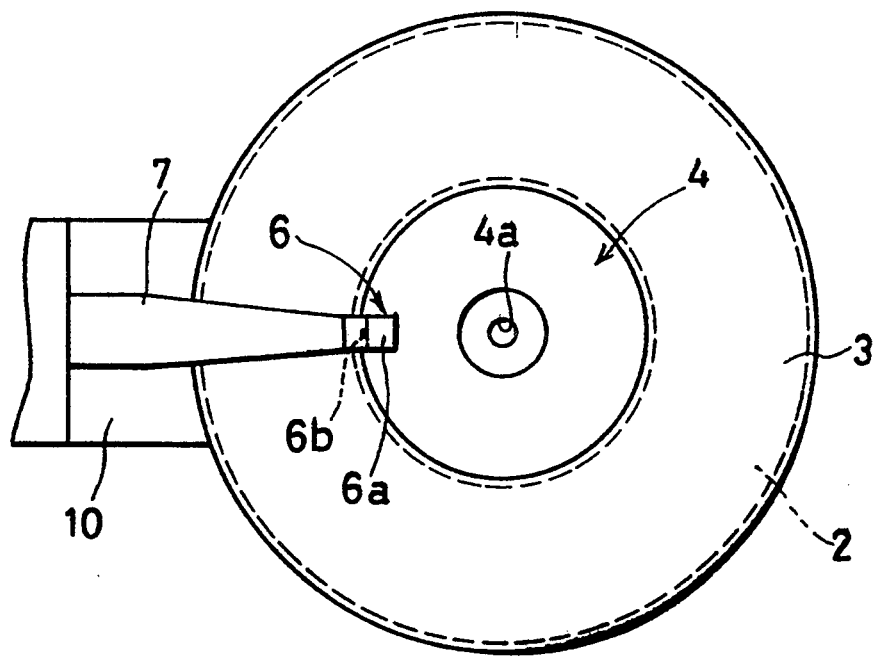
FIG. 1(a) is a schematic plan view illustrating a magneto-optical disk, and a recording and reproducing device.
Figure 1B:
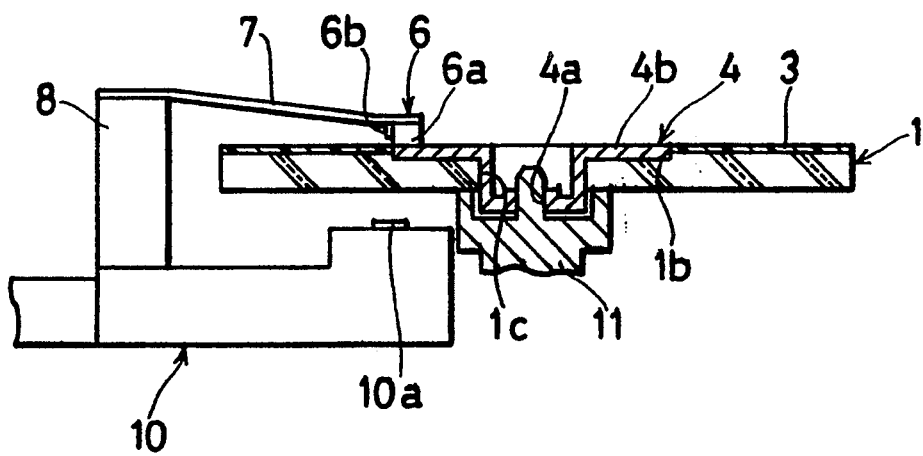
FIG. 1(b) is a schematic vertical section illustrating the magneto-optical disk, and the recording and reproducing device.

The center hub 4 absorbs the eccentricity between the center of a center hole 1c of the transparent substrate 1 and the guide tracks/guide address grooves 1a, and allows a magneto-optical disk to be secured to a rotating spindle 11 of a recording and reproducing device of FIGS. 1(a)(b). The outer diameter of the hub 4 is made larger than a conventional one, which permits a flying head 6 to slide over and come in contact with the surface of the hub 4.

As a material for the center hub 4, stainless steel (for example SUS430) is used by taking the following into account: the hub 4 needs to be magnetically secured into the rotating spindle 11 at the position of its central guide hole 4a; and materials' facility in being processed.

The center hub 4 is bonded to the depression 1b of the transparent substrate 1 by a layer of an adhesive agent 5 at the flange section 4b disposed in the upper edge. As a material for the adhesive layer 5, taking adhesive strength and materials' workability into consideration, epoxy rapid cure adhesives or ultraviolet hardening resins are used.

Regarding the dimensions of the respective sections of the magneto-optical disk, if a polycarbonate substrate with, for example an 86 mm-outer diameter, the center hole 1c with a 15 mm-diameter and a 1.2 mm-thickness, is used as the transparent substrate 1, the guide tracks and the guide address grooves 1a are provided in the portion between the radii of 22 mm and 40 mm of the substrate 1. The recording medium layer 2 is formed within a range of $r_1$ (FIG. 2a))=20.5 mm to $r_2$=41.5 mm, where r represents radius.

In case an area (for CSS) where the flying head 6 is allowed to perform sliding and contacting action is allocated inside of a radius of 20 mm of the disk, it is preferable to have the center hub 4 with a outer diameter of 40 mm. By taking magnetic attraction and mechanical characteristics (for example rigidity and flatness) into account, the plate thickness of the center hub 4 is designed to be about 0.3 mm.

It is very important for the magneto-optical disk that the height ($h_1$) of the center hub 4 and the height ($h_2$) of the protective resin layer 3 should be equal or the difference between $h_1$ and $h_2$ should be very small so as to prevent the flying characteristics of the flying head 6 from being adversely affected.

More precisely, the flying head 6 slides and flies over the sliding and contacting area (CSS area) on the center hub 4 with the rotation of the magneto-optical disk and then moves over the magneto-optical disk in a radial direction while irradiating a laser beam from the optical head 10 so as to access to a desired position. At this time, if there is a great difference in height at the boundary section between the center hub 4 and the protective resin layer 3, head crash may be caused.

Therefore as aforesaid, if the thickness of the center hub 4, adhesive layer 5 and the protective resin layer 3 are 0.3 mm, about 0.05 mm, and about 0.01 mm (10 $\mu$m) respectively, the heights ($h_1$ and $h_2$) of the flange 4b of the hub 4 and the protective resin layer 3 can be substantially identical by making the depression 1b have a depth of about 0.34 mm.

As the center hub 4 absorbs the eccentricity of the guide tracks and guide address grooves 1a, the inner diameter of the depression 1b needs to be slightly larger than the outer diameter of the center hub 4. More concretely, the depression 1b should have an inner diameter of about 4.03 mm which is about 0.3 mm larger than the outer diameter of the center hub 4.

As shown in FIGS. 1(a)(b), the recording and reproducing device using the magneto-optical disk of this embodiment comprises a slider 6a which slides over and comes into contact with the flange 4b of the center hub 4 when the disk starts/stops rotating and is in a static state, and the flying head 6 which is composed of the magnetic field generating member 6b mounted on the slider 6a. The flying head 6 is pressed towards the disk by a suspension 7 whose edge is secured to a supporting base 8.

Below the magneto-optical disk, the optical head 10 having an objective lens 10a is disposed. The objective lens 10a is located opposite the undersurface of the magnetic field generating member 6b. The supporting base 8 is connected to the optical head 10, and the optical head 10 moves over the magneto-optical disk radially together with the flying head 6.

When the magneto-optical disk is placed onto the rotating spindle 11, the guide hole 4a of the center hub 4 is secured to the spindle 11, for example magnetically, and the disk is then rotated by a spindle motor which is not shown.

With the above configuration, the slider 6a of the flying head 6 is in contact with the flange 4b of the center hub 4 when the magneto-optical disk stops rotating.

In recording, the rotation of magneto-optical disk raises an air flow between the flange 4b and the slider 6a, which permits the flying head 6 to fly over the disk. Then, the flying head 6 and the optical head 10 are directed to move from the flange 4b to the recording medium layer 2 and an irradiation of a laser beam and an application of a magnetic field are executed so as to record desired information by overwriting.

When the recording is completed, the flying head 6 is moved back to the flange 4b and then the rotation speed of the magneto-optical disk is gradually decreased. Accordingly, the flying head 6 slides over the flange 4b, and stops on the flange 4b when the disk stops rotating.

In the above arrangement, as the flying head 6 slides over and comes into contact with the center hub 4 made of stainless steel such as SUS430, dust due to the abrasion and damages such as scratches are lessened in comparison to the case where the head 6 slides and comes into contact with the protective resin layer, thereby achieving stable CSS action.

Moreover, as the depression 1b is formed on the substrate 1 and the center hub 4 is mounted thereon, the center hub 4 can be substantially level with the protective resin layer 3. This prevents head crash from being caused even when the flying type magnetic head 6 passes through the boundary section between the center hub 4 and the protective resin layer 3.

Besides, the depression 1b can be formed by contriving the shape of the stamper presser member when manufacturing the transparent substrate 1 by injection molding, the manufacturing cost and the number of parts can not be worsened than the conventional case.

Further, the CSS action can be achieved by only increasing the outer diameter of the center hub 4 without altering its material from the conventional one, and therefore this has the advantages of improving the manufacturing cost and the number of parts compared with a case where another member or lubricating layer needs to be formed for the CSS action.

Figure 11A:
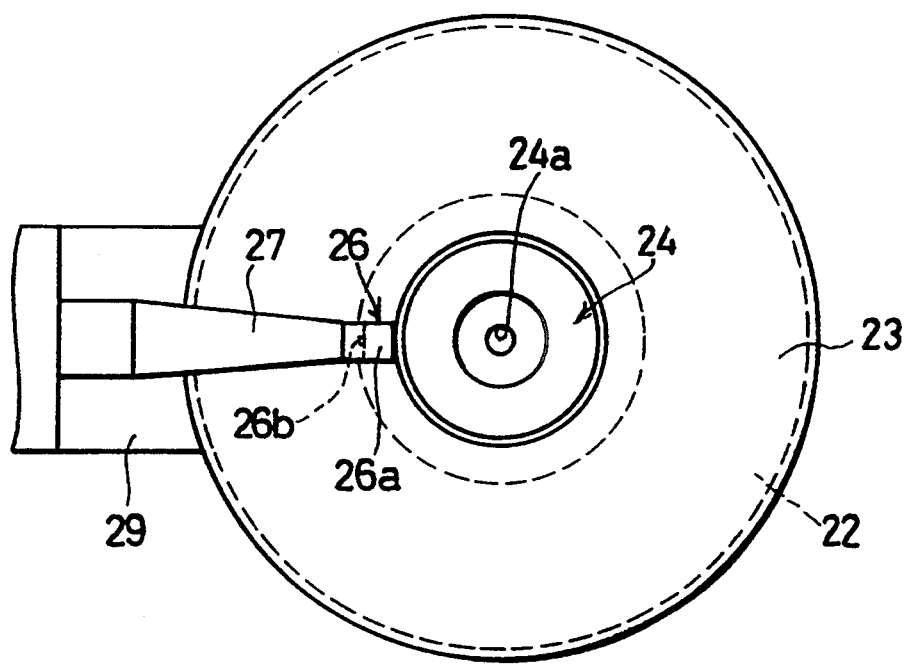
FIG. 11(a) is a schematic plan view illustrating the magneto-optical disk, and a recording and reproducing device.
Figure 11B:
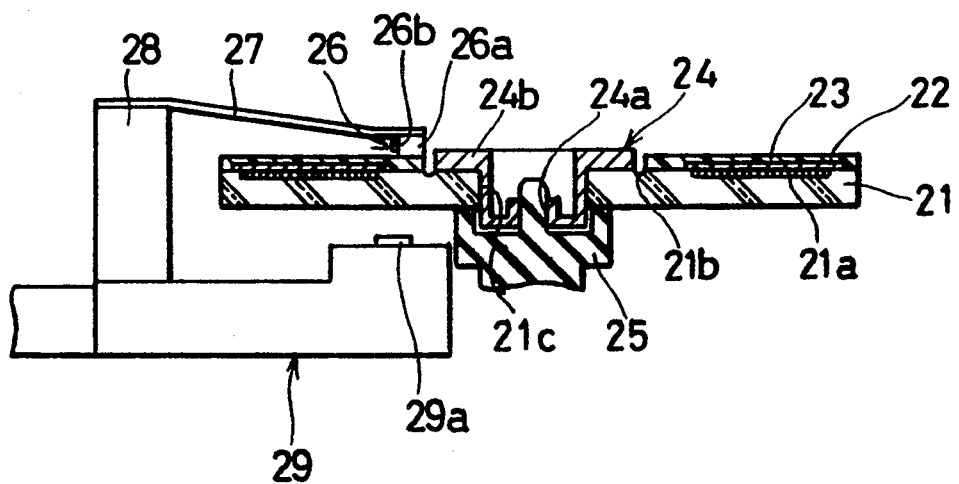
FIG. 11(b) is a schematic vertical section showing the magneto-optical disk, and the recording and reproducing device.

It is also obvious by the comparison between FIGS. 1(a)(b) and FIGS. 11(a)(b) showing a conventional example that the flying head 6 slides over the flange 4b whose outer diameter is larger than the conventional one in this embodiment, thereby allowing the sliding and contacting area to occupy a much larger space than before. Consequently, as the degree of freedom of the shape of the slider 6a of the head 6 increases and there is no possibility of the head 6 moving away from the flange 4b that is a sliding area during sliding, the flying characteristics can be stabilized.

As aforesaid, in the magneto-optical disk of this embodiment, the inner diameter of the depression 1b is slightly larger than the outer diameter of the center hub 4. For example, in case the inner diameter of the depression 1b is 0.3 mm larger than the outer diameter of the center hub 4 as mentioned above, a space of about 0.15 mm-wide is raised between the outer surface of the flange 4b and the inner side face of the depression 1b. If a finished magneto-optical disk has the space, a turbulent air flow which may adversely affect the flying characteristics of the flying head 6 is caused on the disk surface. Thus, it is desirable that a finished magneto-optical disk does not have the space.

Figure 3B:
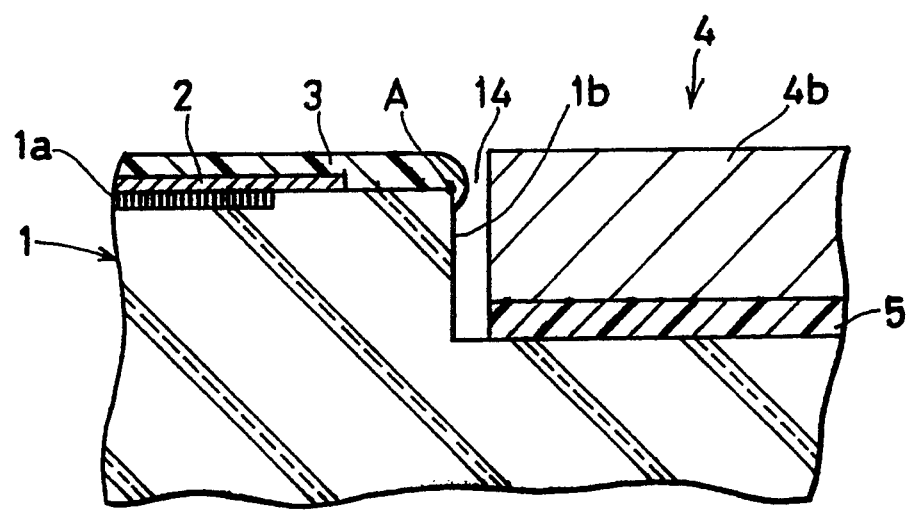
FIG. 3(b) is an enlarged view of the same when the magneto-optical disk of the present invention is manufactured through the processes of a conventional manufacturing.

When the magneto-optical disk of this embodiment is manufactured through the following steps like conventional disks: forming the recording layer 2 and the protective layer 3 on the substrate 1; and mounting the center hub 4 thereon, a drawback is caused. That is to say, a space 14 is raised between the outer surface of the flange 4b and the inner side face of the depression 1b as shown in FIG. 3(b).

More precisely, when forming the protective resin layer 3 on the transparent substrate 1 by spin coating before mounting the center hub 4 thereon, a liquid type ultraviolet hardening resin that is a material for the protective resin layer 3 is dropped onto a top corner A of the inner side face of the depression 1b. Then, the ultraviolet hardening resin spreads over the substrate 1 and the recording medium layer 2 in the shape of a concentric circle as a spinner revolves. At this time, only little of the ultraviolet hardening resin spreads over the depression 1b. Therefore, if the protective resin layer 3 is formed by hardening the ultraviolet hardening resin and the center hub 4 is then mounted thereon, the space 14 is raised between the inner side face of the depression 1b and the center hub 4.

However, in case the ultraviolet hardening resin flows into the depression 1b and the protective resin layer 3 is formed thereon, it forms an obstruction in the installation of the center hub 4. Consequently, it is essential to create the space 14 if the protective resin layer 3 is formed before installing the center hub 4.

As aforesaid in this embodiment, when the center hub 4 is installed after forming the protective resin layer 3 like the conventional case, the space 14 must be formed.

In this embodiment, therefore, the protective resin layer 3 is formed after installing the center hub 4 so as not to create a space between the depression 1b and the center hub 4.

That is to say, during the manufacturing of the magneto-optical disk of this embodiment, first the transparent substrate 1 provided with the guide tracks, the guide address grooves 1a and the depression 1b is manufactured by injection molding. Second, the recording medium layer 2 having multilayer structure is formed by sputtering after going through necessary processes such as cleaning and baking (for degassing).

Then, the flange 4b of the center hub 4 is adhered onto the depression 1b of the transparent substrate 1 with the recording medium layer 2 thereon, by the use of the adhesive layer 5 so that the guide hole 4a becomes coaxial with the guide tracks and the guide address grooves 1a. In this state, the surface of the flange 4b is slightly higher than the surface of the recording medium layer 2 formed on the transparent substrate 1.

Figure 4A:
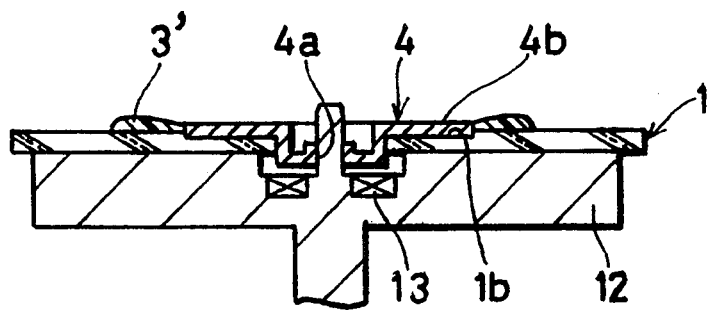
FIG. 4(a) to FIG. 4(c) show schematic vertical sections respectively illustrating the processes of forming a protective resin layer.

The process of forming the protective resin layer 3 comes next. As shown in FIG. 4(a), the transparent substrate 1 whereon the recording medium layer 2 (not shown in FIG. 4) is formed and the center hub 4 is installed into a rotating table 12 of the spinner. The installation is made by means of a magnet 13 provided on the rotating table 12, and chucking using a vacuum is carried out if needed.

With this state, in order to fill in the space between the outer surface of the flange 4b and the inner side face of the depression 1b, a liquid type ultraviolet hardening resin 3' is dropped onto a portion of the transparent substrate 1 which is located slightly outside of the outer edge of the flange 4b. The dropping of the ultraviolet hardening resin 3' may be executed by spinning the rotating table 12 slowly while securing the dropping spout, or while moving the dropping spout in a circumference direction of the transparent substrate 1.

The ultraviolet hardening resin 3' dropped in the above-mentioned manner spreads over the transparent substrate 1 both outwards and inwards as shown in FIG. 4(a). In the inner portion of the substrate 1, it joins to the outer surface of the flange 4b, and also flows into the space between the inner side face of the depression 1b and the outer surface of the flange 4b as shown in FIG. 3(a) so as to form the protective resin layer 3 in the space.

Figure 4B:
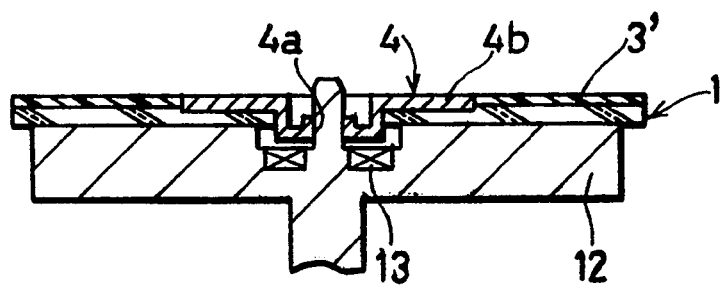

Next, if the ultraviolet hardening resin 3' is continuously dropped while spinning the rotating table at a constant speed, the resin 3' covers the surface of portions of the transparent substrate 1 outside of the flange 4b (FIG. 4(b)).

Figure 4C:
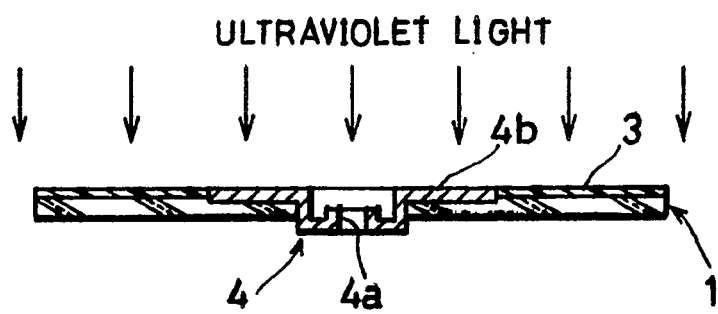

The ultraviolet hardening resin 3' is then hardened by irradiating ultraviolet light thereon from the upper side as shown in FIG. 4(c), which allows the protective resin layer 3 to be formed.

As mentioned above, it is possible to manufacture the magneto-optical disk having no space between the outer surface of the flange 4b and the inner side face of the depression 1b by the manufacturing method of this embodiment. With this method, a magneto-optical disk having a protective resin layer which joins to the outer edge of a center hub can be manufactured with a high reproducibility. In the magneto-optical disk, there is no space between the outer edge of the center hub and the protective resin layer, so that no change is caused in the flying characteristics even when the flying type magnetic head passes through the boundary section between the center hub and the protective resin layer. This further prevents head crash from being caused.

In this embodiment, while the center hub 4 is made of stainless steel such as SUS430, it may be made of other metallic materials. However, it is desirable to use a material having the property of being attracted by a magnet.

Regarding the top corner A (FIG. 3(a)) of the inner side face of the depression 1b, it is a right angled corner in this embodiment, however it can be formed in any shape permitting the ultraviolet hardening resin 3' to easily flow into the space between the inner side face of the depression 1b and the flange 4b, for example in the shape of a circular arc.

Moreover, while the installation of the center hub 4 is made after forming the recording medium layer 2 on the transparent substrate 1 in the above-mentioned method of manufacturing a magneto-optical disk, the recording medium layer 2 and the protective resin layer 3 may also be formed after mounting the center hub 4 on the transparent substrate 1.

Further, the transparent substrate 1 may be made of transparent resins other than polycarbonate, such as acrylic and an epoxy resin if the depression 1b for installing the center hub 4 is provided. The center hub 4 can be adhered to the depression 1b by the use of a double-sided adhesive tape achieving a predetermined adhesive strength and reliability.

Figure 5:
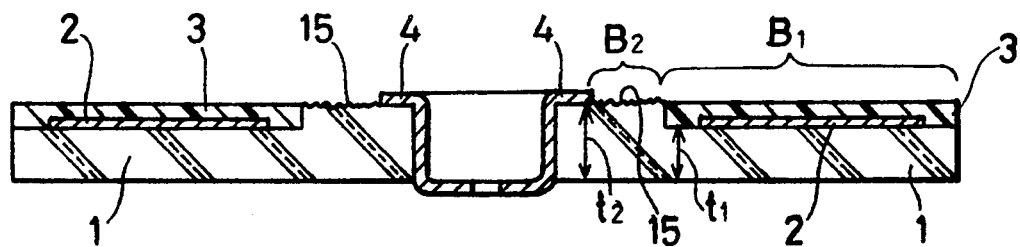
FIG. 5 and FIG. 6 illustrate another embodiment of the present invention.
Figure 6:
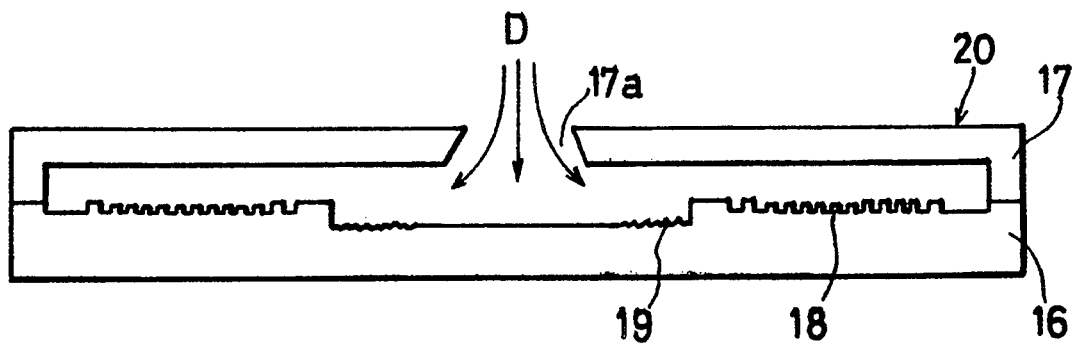
Figure 8A:
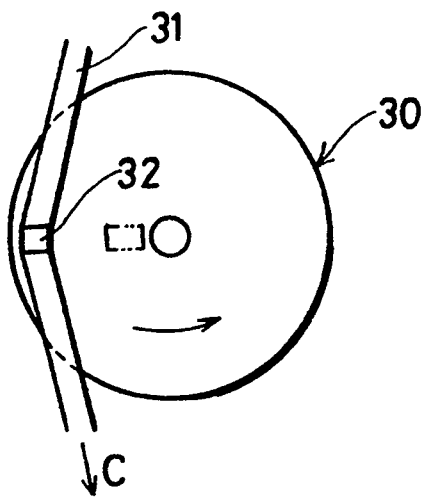
FIG. 8(a) and FIG. 8(b) are explanatory views illustrating the processes of giving a texture to a magneto-optical disk by the use of a texture tape.
Figure 8B:
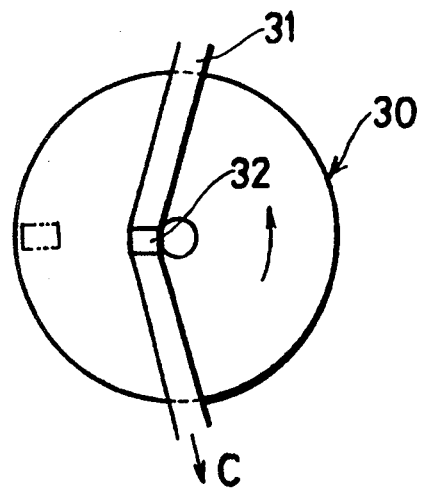
Figure 9:
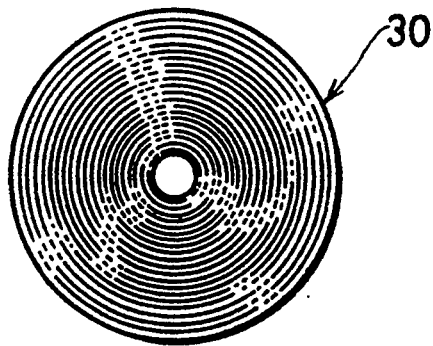
Figure 10A:
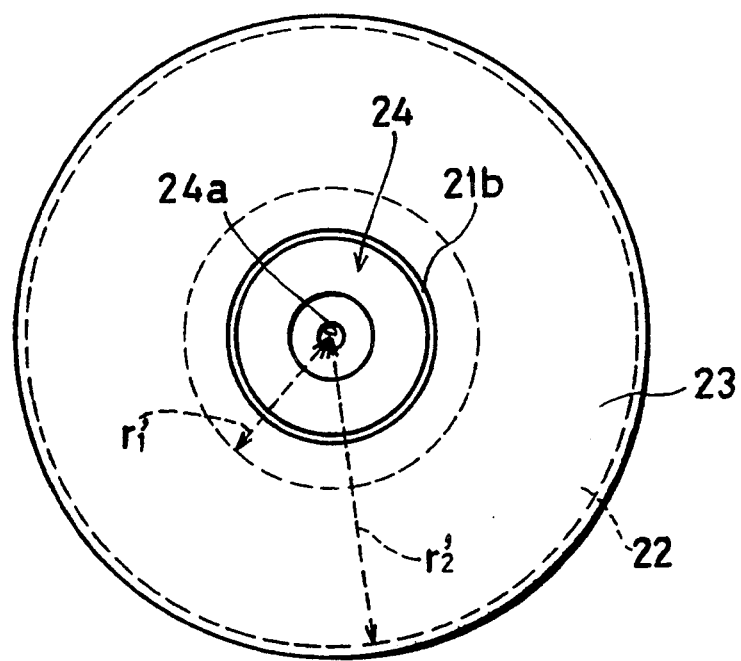
FIG. 10(a) is a schematic plan view illustrating the magneto-optical disk.
Figure 10B:
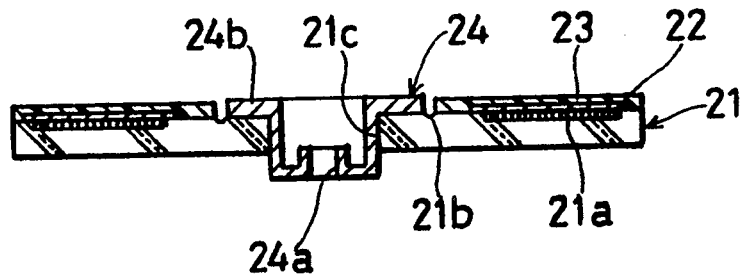
FIG. 10(b) is a schematic vertical section of the magneto-optical disk.

Referring to FIG. 5 and FIG. 6, the following will describe another embodiment of the present invention. For members whose functions are equal to the members of the above embodiment, the same reference numerals are given thereto and the detailed explanations will be omitted here.

As shown in FIG. 5, a magneto-optical disk relating to the present invention is manufactured such that a recording layer 2 is formed on an area $B_1$ on a surface of a transparent substrate 1 by evaporation or sputtering. The recording layer 2 has a single layer, or multilayer structure made of a dielectric film, a recording film and a reflecting film. The transparent substrate 1 is made of polycarbonate, polymethyl methacrylate, amorphous polyolefine and the like. A protective layer 3 made of a UV hardening resin is also formed to protect the recording layer 2.

An area on one side of the substrate, i.e. the side whereon the recording layer 2 is formed, located inside of the area $B_1$ has a substrate thickness $t_2$ which is thicker than a substrate thickness $t_1$ of the area $B_1$ by the thickness of the recording layer 2 and the protective layer 3.

In addition, small physical bumps and pits 15 are formed on the surface of an area $B_2$ of the substrate 1.

As a center hub 4 is adhered to the inside of the hole of the substrate 1, the magneto-optical disk is accurately placed into a magneto-optical recording and reproducing device (not shown) without eccentricity.

When recording and reproducing information on a magneto-optical disk of the above structure which is placed into the magneto-optical recording and reproducing device, a flying head 6 (FIG. 1) comes into contact with the area $B_2$ on which the bumps and pits are formed and then flies over the disk with the rotation of the disk. The head 6 which is flying over the disk moves to the area $B_1$ located in the outer portion of the disk and executes the recording and reproducing operations. When stopping, the head 6 returns to the area $B_2$. In this case, as the bumps and pits 15 are formed in the area $B_2$ on the surface of the substrate 1, the flying head 6 does not stick to the magneto-optical disk.

Next, a method of manufacturing the above-mentioned magneto-optical disk will be described below.

As shown in FIG. 6, a mold 20 which is used in one of the manufacturing methods, i.e. injection molding, comprises a stamper 16 and a back surface section 17. Firstly, a resin D which is, for example, melted polycarbonate, polymethyl methacrylate and amorphous olefin, is poured into the space between the stamper 16 and the back surface section 17 from a sprue section 17a of the back surface section 17.

Secondly, the poured resin D is taken out after being cooled sufficiently and then a hole is punched so as to provide the substrate 1 whereon guiding grooves 18 and bumps and pits 19 of the stamper 16 are copied.

Then, the recording layer 2 and a protective layer 3 are formed in that order on the substrate 1 to manufacture a magneto-optical disk.

In this embodiment, the resin substrate 1 which is manufactured by injection molding is explained, however the following two types of substrate can also be used. i) A glass substrate whereon guiding grooves and physical bumps and pits are formed by the use of an optical hardening resin based on the photo polymer method (2P method). ii) A glass substrate whereon guiding grooves, and physical bumps and pits are directly formed by etching.

The invention being thus described, it will be obvious that the same may be varied in many ways. Such variations are not to be regarded as a departure from the scope of the invention, and all such modifications as would be obvious to one skilled in the art are intended to be included within the scope of the following claims.

What is claimed is:

1. A magneto-optical disk comprising:
   a substrate having a first surface and a second surface;
   a depression formed on an inner portion of the first surface;
   a magneto-optical recording medium formed on an outer portion of the first surface;
   a protective resin layer for covering the magneto-optical recording medium;
   a center hub having a guide hole and an outer flange which is mounted on the depression and the second surface so that the center hub outer flange is substantially level with the protective resin layer; said guide hole for a spindle and
   an area of said flange where a flying head performs sliding and contacting action.

2. The magneto-optical disk as defined in claim 1, wherein the center hub is made of stainless steel having the property of being attracted by a magnet.

3. The magneto-optical disk as defined in claim 1, wherein the outer diameter of the substrate is 86 mm, the outer diameter of the center hub is 40 mm and the inner diameter of the depression is 4.03 mm.

4. A magneto-optical disk comprising:
   a substrate;
   a magneto-optical recording medium formed on an outer portion of the substrate; and
   an area provided on an inner portion of the substrate, where a flying head performs sliding and contacting action,
   wherein small physical bumps and pits are created in the area of the substrate.

5. A magneto-optical disk comprising:
   a substrate having an outer portion and an inner portion;
   a depression formed in the outer portion;
   a magneto-optical recording medium formed on the depression;
   a protective resin layer which covers the magneto-optical recording medium so as to be substantially level with the inner portion; and
   an area in the inner portion where a flying head performs sliding and contacting action,
   wherein small physical bumps and pits are created in the area.

6. A magneto-optical recording and reproducing system comprising a flying head having a slider and a magneto-optical disk comprising:
   a substrate having a first surface and a second surface;
   a depression formed on an inner portion of the first surface;
   a magneto-optical recording medium formed on an outer portion on the first surface;
   a protective resin layer for covering the magneto-optical recording medium;
   a center hub having an outer flange which is mounted on the depression and the second surface so that the center hub outer flange is substantially level with the protective resin layer;
   an area where a flying head performs sliding and contacting action, the area being provided on the center hub outer flange, and said slider contacting said area of said hub when said disk is in a static state.

7. The magneto-optical disk as defined in claim 6 wherein the center hub is made of stainless steel having the property of being attracted by a magnet.

8. The magneto-optical disk as defined in claim 6, wherein the outer diameter of the substrate is 86 mm, the outer diameter of the center hub is 40 mm and the inner diameter of the depression is 4.03 mm.

* * * * *